United States Patent [19]
Ketcham et al.

[11] Patent Number: 5,175,132
[45] Date of Patent: Dec. 29, 1992

[54] SINTERABLE CERAMIC COMPOSITIONS

[76] Inventors: Thomas D. Ketcham, 319 Valley Rd., Big Flats, N.Y. 14814; Leroy S. Share, 262 Cutler Ave., Corning, N.Y. 14830

[21] Appl. No.: 794,505

[22] Filed: Nov. 19, 1991

[51] Int. Cl.⁵ .......................................... C04B 35/48
[52] U.S. Cl. .................................. 501/103; 501/105; 501/119; 501/120; 501/127; 501/128
[58] Field of Search ............... 501/103, 105, 120, 127, 501/128, 119

[56] References Cited

U.S. PATENT DOCUMENTS

| | | | |
|---|---|---|---|
| 3,607,323 | 9/1971 | Tedmon, Jr. .................... | 501/103 |
| 3,887,387 | 6/1975 | Sturhahn ........................ | 501/104 |
| 4,719,188 | 1/1988 | Koba et al. .................... | 501/133 |
| 4,742,030 | 5/1988 | Masaki et al. .................. | 501/103 |
| 4,753,902 | 6/1988 | Ketcham ........................ | 501/103 |
| 5,004,711 | 4/1991 | Grodek ........................... | 501/103 |
| 5,055,433 | 10/1991 | Niwa et al. ..................... | 501/105 |

OTHER PUBLICATIONS

I. B. Cutler et al., "Sintering Alumina at Temperatures of 1400#C and Below", *J. Am. Ceram. Soc.*, 40 (4), pp. 134–139 (1957).

W. R. Cannon, "High Creep Ductility in Alumina-Containing Compensating Additives", *Advances in Ceramics*, vol. 10, Structure and Properties of MgO and Al₂O₃, pp. 741–749, Am. Ceram. Soc., (1984).

M. Kimura, "Preparation of Low-$Y_2O_3$-TZP by Low Temperature Sintering", *Science and Technology of Zirconia, III*, pp. 183–191, Am. Ceram. Soc. (1988).

C-M. J. Hwang et al., "Effect of A Liquid Phase on Super Plasticity of 2% Mol-$Y_2O_3$-Stabilized Tetragonal Zirconia Polycrystals" *J. Am. Ceram. Soc.*, 73 (6), pp. 1626–1632 (1990).

I-Wei Chen et al., in "Development of Super-Plastic Structural Ceramics", *J. Am. Ceram. Soc.*, 73 (9), pp. 2585–2609 (1990).

I-Wei-Chen, U.S. AFOSR Report No. AD-A200-202 (Aug. 25, 1988).

L. A. Xue et al., "Low-Temperature Sintering of Alumina with Liquid-Forming Additives", *J. Am. Cer. Soc.* 74 [8] 2011–2013 (1991).

*Primary Examiner*—Mark L. Bell
*Assistant Examiner*—Paul Marcantoni
*Attorney, Agent, or Firm*—Kees van der Sterre

[57] ABSTRACT

Hard crystalline sintered ceramic products, and a method for making them at substantially reduced sintering temperatures, are disclosed, the products being manufactured by the sintering of mixtures comprising one or more ceramic powders selected from among zirconia, stabilized zirconia, partially stabilized zirconia, alumina, mullite, cordierite, and $MgAl_2O_4$ spinal together with a combination sintering aide including $TiO_2$ and at least one transition metal oxide selected from the group consisting of copper oxide, manganese oxide, cobalt oxide and zinc oxide, the mixture comprising at least about 3.5 mole percent $TiO_2$, at least about 1.3 percent of transition metal oxides, about 4.8–50 mole percent total of $TiO_2$+transition metal oxides, and the remainder ceramic powder. Sintering of these mixtures at temperatures typically 200°–350° C. below the pure powder sintering temperatures of the base ceramics provides products with open porosities less than 5% by volume, more typically 0–2% by volume.

11 Claims, No Drawings

5,175,132

SINTERABLE CERAMIC COMPOSITIONS

BACKGROUND OF THE INVENTION

The present invention relates to ceramic compositions of high density and high hardness, and more particularly to sinterable compositions for ceramics based on zirconia, alumina, spinel, mullite or cordierite, which compositions exhibit the capability of being sintered to highly dense products exhibiting no or low open porosity at greatly reduced sintering temperatures.

Ceramic materials exhibiting high hardness and high density are useful for a variety of applications including, for example, armor materials, wear materials, materials for cutting edges, precision machine ceramic components, and other applications. It is known that, when ceramics of these types do not have to withstand particularly high temperatures, sintering aides can be used to reduce the difficulty of fabrication. Hence, when added to the base ceramics these aides lower the temperatures to which the ceramic precursor powders must be heated to sinter them to full density with low open porosity.

I. B. Cutler et al., in "Sintering Alumina at Temperatures of 1400° C. and Below", *J. Am. Ceram. Soc.*, 40 (4), pages 134-139 (1957), describe alumina ceramics containing manganese oxide, copper oxide, titanium oxide, and combinations of titania with manganese oxide or titania with copper oxide wherein sintering temperatures as low as 1300° C. could be achieved. W. R. Cannon, in "High Creep Ductility in Alumina Containing Compensating Additives", *Advances in Ceramics*, Vol. 10, Structure and Properties of MgO and $Al_2O_3$, pages 741-749, Am. Ceram. Soc., (1984), added 2 mol percent of each of copper oxide and titania to achieve alumina sintering at 1200° C.

U.S. Pat. No. 4,719,188 discloses abrasion-resistant aluminas comprising up to 4% total of $TiO_2$ plus CuO in combination with 0.5-4% of various other transition metal oxides including manganese oxide. These materials were reported to be sinterable at 1200° C.

Sinterable zirconia compositions have also received considerable attention. Hence M. Kimura, in "Preparation of Low-$Y_2O_3$-TZP By Low Temperature Sintering", *Science and Technology of Zirconia, III*, pages 183-191, Am. Ceram. Soc. (1988), describes powdered yttria-stabilized zirconia containing copper or manganese oxide which may be sintered at temperatures as low as 1200° C. See also I-Wei-Chen, U.S. AFOSR Report No. AD-A200-202 (Aug. 25, 1988).

C-M. J. Hwang et al., in "Effect of A Liquid Phase on Super Plasticity of 2% Mol-$Y_2O_3$-Stabilized Tetragonal Zirconia Polycrystals" *J. Am. Ceram. Soc.*, 73 (6), pages 1626-1632 (1990), achieve the sintering of colloidal stabilized zirconia containing small additions of copper oxides. Also, I-Wei Chen et al., in "Development of Super-Plastic Structural Ceramics", *J. Am. Ceram. Soc.*, 73 (9), pages 2585-2609 (1990), describe super plasticity in stabilized zirconia polycrystalline products comprising copper oxide additions.

While the foregoing publications indicate considerable progress in reducing the sintering temperatures of hard ceramics such as alumina and zirconia, it will be evident that still further reductions in such sintering temperatures would be useful. Of particular interest for many of the above-noted applications for hard ceramics would be sinterable ceramic compositions achieving low porosity and high density at sintering temperatures in the 800°-1100° C. range. To date, no combination of sintering aides effective to reproducibly provide dependable sintering at these temperature, while maintaining high density and hardness in the product, has been discovered.

SUMMARY OF THE INVENTION

In accordance with the present invention a family of oxide compositions exhibiting considerably improved sinterability is provided. The compositions comprise a combination of sintering aides, including $TiO_2$ and CuO or an equivalent transition metal oxide as essential constituents, which combination permits the sintering temperatures of base ceramics such as alumina, zirconia, and the like to be substantially reduced. In some cases, reductions in sintering temperature by as much as 350° C. are achieved, while still retaining high density and essentially no open porosity in the sintered product.

The invention is applicable to a relatively wide variety of base ceramics normally requiring sintering at temperatures well in excess of 1000° C. In general, reductions in sintering temperatures sufficient to achieve good consolidation at temperatures in the range of 800°-1100° C., even for the most refractory of the ceramics treated, are possible.

In broad aspect, then, the invention includes hard crystalline sintered ceramic articles composed of a hard crystalline ceramic phase or component and a sintering aide. The hard ceramic component is a ceramic selected from the group consisting of zirconia, partially stabilized zirconia (TZP or Tetragonal Zirconia Polycrystals), stabilized zirconia, alumina, mullite, cordierite, $MgAl_2O_4$ spinel, and combinations thereof. The sintering aide component of the article will consist essentially of a combination of $TiO_2$ and at least one transition metal oxide selected from the group consisting of copper oxide, manganese oxide, cobalt oxide and zinc oxide.

For effective sintering to low or no open porosity at low temperatures, the sintering aide will be present in a proportion providing a final article composition which includes at least about 3.5 mole percent $TiO_2$, at least about 1.3 mole percent of transition metal oxides, and about 4.8-50 mole percent total of $TiO_2$ + transition metal oxides. The remainder of the article composition will be composed of the hard ceramic component.

In a further aspect, the invention resides in a method for making a hard crystalline sintered ceramic product at a substantially reduced temperature, by combining refractory ceramic powders with a novel combination of sintering aides. Refractory ceramic powders useful in accordance with the invention include ceramic powders selected from the group consisting of zirconia, stabilized zirconia, partially stabilized zirconia, alumina, mullite, cordierite, $MgAl_2O_4$ spinel, and combinations thereof.

The ceramic powder selected for use in the method is combined with a sintering aide to provide a sinterable mixture, the sintering aide consisting essentially of a combination of $TiO_2$ and at least one transition metal oxide selected from the group consisting of copper oxide, manganese oxide, cobalt oxide and zinc oxide. The sinterable mixture will have a composition which comprises at least about 3.5 mole percent $TiO_2$, at least about 1.3 mole percent of transition metal oxides, about 4.8-50 mole percent total of $TiO_2$ + transition metal oxides, and the remainder ceramic powder.

The sinterable mixture thus provided is next heated to a temperature at least sufficient to provide a hard crystalline ceramic product of the desired low open porosity. For present purposes, it is desired that the product have not more than 5% by volume of open porosity, and a sintering temperature at least sufficient to achieve this level of consolidation will normally be utilized.

In general, the sinterability of mixtures provided in accordance with the invention are sufficiently enhanced that sintering temperatures at least 100° C. below the minimum sintering temperature for zero porosity sintering of the ceramic powder component of the product may be used to achieve this level of consolidation. In the preferred compositions, temperatures 200°-350° C. below the minimum sintering temperature for the ceramic component can provide products exhibiting 0-2% (volume) of open porosity. By the minimum sintering temperature for zero porosity of the ceramic powder component is simply meant that temperature, generally accepted in the art, which is the minimum sintering temperature needed to achieve zero open porosity consolidation of the ceramic powder alone, with no added sintering aides.

Ceramic products provided in accordance with the invention can offer significant manufacturing cost advantages over similarly based ceramic products produced by pressureless sintering at higher temperatures, or by high-pressure consolidation. Yet these products still provide excellent combinations of hardness, fracture toughness, and flexural strength notwithstanding the incorporation of substantial proportions of sintering aides therein.

DETAILED DESCRIPTION

The particular ceramic powders and sintering aide mixtures selected for making sintered ceramics according to the invention are not critical. In the case of the base ceramic powders, commercially available ceramic powders are customarily employed, these being combined with the sintering aides in the form of oxides or precursors for those oxides, such as the nitrates or carbonates thereof. Where stabilizers for zirconia-based compositions are employed, such as the rare earth oxides, these may be provided as oxides or again as oxide precursors which will decompose to oxides during the sintering process.

The difficulty of sintering these powders alone has been well documented in the literature. The sintering of pure alumina or zirconia to full density (or zero open porosity) generally requires sintering temperatures of 1500° C. and 1300° C., respectively, unless special powders or extensive powder processing are used. Stabilized zirconia compositions exhibit sintering similar to that of zirconia, while zirconia-toughened aluminas typically sinter to full density at about 1450° C. Spinel, mullite and cordierite reach full pressureless densification at temperatures of 1550° C., 1600° C., and >1400° C., respectively.

The invention permits the sintering of hard ceramic products incorporating major proportions of these ceramics at greatly reduced temperatures, and the products may readily be produced from powder batches comprising the ceramics and sintering aides utilizing conventional ceramic processing procedures. A convenient method comprises preliminarily cold pressing fine powder mixtures of the selected base ceramic powders with the selected sintering aides, and then sintering the pressings at temperatures sufficient to achieve substantially zero open porosity and near theoretical density.

A representative procedure for producing such ceramic products from commercial starting materials is as follows. Fine oxide or nitrate powders of the selected components are first provided. Zirconia and zirconia stabilized with yttria (2 mole percent) or ceria (12 mole percent) are obtained as powders from the Tosoh Company of Tokyo Japan. Supplemental stabilizers for the zirconia, such as yttria, neodymia, ytterbia and gadolinia, are obtained by calcining reagent grade nitrates of these rare earth elements in air.

To provide mullite ceramics, mullite powder is commercially obtained from Baikowski International Company as CR deagglomerated mullite. Magnesium aluminate spinel is purchased as Cernel No. 75 powder from the Dow Chemical Company, Midland Mich., while alumina in the form of Malakoff RD-HP DBM alumina (without MgO) is obtained from Malakoff Industries Inc., Malakoff, Tex.

To provide the required sintering aides, fine titania powder is obtained from the Degussa Corporation as P25 titanium dioxide (particles sizes of 15-40 nm). Copper oxide is introduced in the form of reagent grade copper oxide from Baker Chemicals Incorporated.

To assure product homogeneity, compositions formulated from these powders are ball-milled in absolute methanol using zirconia grinding media for 24 hours, then dried, screened, and preliminarily calcined at 800° C. in air for three hours. The pre-calcined powders are next dry-milled for an additional 24 hours, screened, and then uniaxially pressed at 35 Kpsi (241 MPa) to provide pellets.

Sintering of the cold-pressed pellets produced as described is carried out by firing at preselected temperatures in covered alumina crucibles. The sintered pellets are then tested for density and open porosity, and optionally for hardness, toughness and bend strength.

The following Tables set forth a number of specific examples of ceramic products made by the cold pressing and sintering procedures above described. The examples shown in Tables IA-IB are stabilized zirconia formulations, each comprising additions of titania and/or copper oxide to illustrate the effects of these additives on the sinterability these very useful commercial materials. Table IA reports the compositions of the powder batches, in mole percent, while Table IB reports the sintering temperatures used to evaluate sinterability, and the results of the sintering treatment. As previously suggested, in the absence of sintering aides the commercial yttria-stabilized zirconia ceramic powders such as shown in Table IA normally require heating to temperatures of at least about 1300° C. in order to achieve zero open porosity by pressureless sintering.

TABLE IA

| | Compositions Sinterable $Y_2O_3$-Stabilized Zirconias | | | |
|---|---|---|---|---|
| Example | Sintering Aides | | Ceramic Powder | |
| No. | CuO | $TiO_2$ | $ZrO_2$ | $Y_2O_3$ |
| 1 | 5.9 | — | 92.6 | 1.9 |
| 2 | 0.15 | 20.0 | 78.3 | 1.6 |
| 3 | 0.73 | 19.9 | 77.8 | 1.6 |
| 4 | 1.45 | 19.7 | 77.3 | 1.6 |
| 5 | 2.9 | 19.4 | 76.1 | 1.55 |
| 6 | 5.5 | 18.9 | 74.1 | 1.5 |
| 7 | 4.6 | 0.5 | 93.0 | 1.9 |
| 8 | 4.6 | 0.95 | 92.5 | 1.9 |
| 9 | 4.6 | 2.86 | 90.7 | 1.85 |
| 10 | 4.6 | 4.8 | 88.85 | 1.8 |

TABLE IA-continued

Compositions
Sinterable $Y_2O_3$-Stabilized Zirconias

| Example No. | Sintering Aides | | Ceramic Powder | |
|---|---|---|---|---|
| | CuO | $TiO_2$ | $ZrO_2$ | $Y_2O_3$ |
| 11 | 4.5 | 9.55 | 84.25 | 1.7 |
| 12 | 4.4 | 14.3 | 79.6 | 1.6 |
| 13 | 4.0 | 38.4 | 56.4 | 1.2 |
| 14 | 10.0 | 25.0 | 58.5 | 6.5 |
| 15 | 10.0 | 40.0 | 49.0 | 1.0 |
| 16 | 20.0 | 30.0 | 49.0 | 1.0 |
| 17 | 30.0 | 20.0 | 49.0 | 1.0 |
| 18 | 40.0 | 10.0 | 49.0 | 1.0 |
| 19 | 30.0 | 10.0 | 58.8 | 1.2 |

TABLE IB

Sintering Results
Sinterable $Y_2O_3$-Stabilized Zirconias

| Example No. | Sinter. Temp. (°C.) | Sinter. Time (hrs) | Open Porosity (Vol. %) | Density (g/cc) | Sp.Gr. (g/cc) |
|---|---|---|---|---|---|
| 1 | 1000 | 20 | 56.3 | 3.44 | — |
|   | 1100 | 20 | 26.1 | 4.28 | 5.79 |
| 2 | 1200 | 3 | 31.1 | 3.82 | 5.55 |
| 3 | 1200 | 3 | 34.4 | 3.69 | 5.63 |
| 4 | " | " | 32.3 | 3.73 | 5.46 |
| 5 | 1050 | " | 3.4 | 5.21 | 5.39 |
| 6 | 1000 | " | 0.0 | 5.46 | 5.46 |
| 7 | 1150 | " | 21.3 | 4.52 | 5.74 |
| 8 | " | " | 20.3 | 4.51 | 5.66 |
| 9 | " | " | 1.2 | 5.26 | 5.32 |
| 10 | " | " | 1.6 | 5.32 | 5.41 |
| 11 | 1000 | " | 0.0 | 5.68 | 5.68 |
| 12 | " | " | 0.0 | 5.57 | 5.57 |
| 13 | " | " | 0.0 | 5.12 | 5.12 |
| 13 | 1150 | " | 1.1 | 5.24 | 5.30 |
| 13 | 1200 | " | 1.8 | 5.16 | 5.26 |
| 14 | 1000 | " | 0.0 | 5.30 | 5.30 |
| 14 | 1100 | " | 0.0 | 5.26 | 5.26 |
| 15 | 1000 | " | 0.0 | 5.12 | 5.12 |
| 16 | " | " | 0.0 | 5.15 | 5.15 |
| 17 | " | " | 0.0 | 5.45 | 5.45 |
| 18 | " | " | 0.0 | 5.61 | 5.61 |
| 19 | " | " | 0.0 | 5.59 | 5.59 |

The volume percent of open porosity (also known as apparent porosity) for each of the examples shown in Table IB above, and in the following Tables, is calculated from difference between the water-saturated weight of each sample and the dry weight thereof (yielding the volume of the open pores), divided by the volume of the sample. The volume of the sample is determined by the Archimedes method using the difference between the saturated weight and the suspended weight of the sample in water. The density of the fluid, water, is taken as 1 g/cc.

The Density data in the Tables are actual sample densities calculated from the volumes and dry weights of each sample. The Specific Gravity data correspond to the density values of the impervious portion of the samples in each case, i.e., it includes any closed porosity but not the open porosity of each sample. These are calculated from the actual dry and suspended weights as above described.

In most cases, the Specific Gravity values reported will be close to the maximum theoretical densities of the compositions being sintered. Of course, maximum theoretical densities for highly oxide-modified ceramic materials of the type shown cannot be calculated with complete accuracy unless the volume fraction of the various phases present in the sample (e.g., hexagonal, orthorhombic, tetragonal, monoclinic, cubic, etc.), and the exact composition of each phase, are known. Nevertheless, theoretical density calculations performed on selected sinterable compositions provided in accordance with the invention showed good correspondence between the reported Specific Gravities and calculated maximum theoretical densities. These results confirm that these highly sinterable materials do not generally retain significant levels of internal or closed porosity.

A study of the data presented in Tables IA and IB illustrates several important features of the invention. First, a proper combination of the specified sintering aides is required to achieve full consolidation to zero or near-zero open porosity. Samples containing insufficient CuO (e.g., Examples 2-4) fail to sinter adequately even at 1200° C., while samples containing insufficient $TiO_2$ (e.g., Example 1, 7 and 8) also demonstrate only marginal sintering.

Secondly, very substantial reductions in the sintering temperature necessary to eliminate open porosity in these zirconia-based ceramic materials have been achieved. Where a balanced combination of sintering aides is employed, as for example in the case of Examples 6, 11 and 12 in Table IA, sintering to zero open porosity at temperatures not exceeding 1000° C. is readily achieved.

Also significant is the fact that very large amounts of operative combinations of sintering aides can be used without reversing the beneficial effects on sintering of these additives. This feature is clearly shown by Examples 14-19 of the Tables.

As previously noted, the invention is not limited in its application to zirconia ceramics stabilized with yttria only. Advantageous results are also achieved in zirconia powders comprising no stabilizers, or containing other effective stabilizers of rare earth or related type. Tables IIA and IIB below illustrate compositions comprising exemplary zirconia powders of these alternative types, and sintering test results conducted on those compositions. Again, all compositions are report in moles and closely approximate mole percent values.

TABLE IIA

| Example No. | Compositions - Alternative Zirconia Powders | | | |
|---|---|---|---|---|
| | Sintering Aides | | Ceramic Powder | |
| | CuO | $TiO_2$ | $ZrO_2$ | Stabilizer |
| 21 | 10.0 | 25.0 | 65.0 | none |
| 22 | 10.0 | 25.0 | 63.05 | 1.95 ($Nd_2O_3$) |
| 23 | 10.0 | 25.0 | 63.05 | 1.95 (½ $Gd_2O_3$, ½ $Yb_2O_3$) |
| 24 | 10.0 | 25.0 | 57.2 | 7.8 ($CeO_2$) |

TABLE IIB

Sintering - Alternative Zirconia Powders

| Example No. | Sinter Treatment | | Open Porosity (%) | Density (g/cc) | Sp.Gr. (g/cc) |
|---|---|---|---|---|---|
| | Temp. (°C.) | Time (hrs) | | | |
| 21 | 1000 | 3 | 0.0 | 5.36 | 5.36 |
|    | 1100 | " | 0.0 | 5.40 | 5.40 |
| 22 | " | " | 0.0 | 5.57 | 5.57 |
| 23 | 1000 | " | 15.5 | 4.73 | 5.60 |
|    | 1050 | " | 0.0 | 5.53 | 5.53 |
| 24 | " | " | 3.0 | 5.30 | 5.46 |
|    | 1100 | " | 0.0 | 5.71 | 5.71 |

As previously noted, some improvements in sintering behavior may also be achieved when copper oxide is replaced by certain other transition metal oxides, although not all such oxides yield beneficial results. Tables IIIA and IIIB below set forth examples of stabilized zirconia compositions containing combinations of sintering aides including $TiO_2$ plus other oxides, the compositions in Table IIIA being reported in approximate mole percent. In the cases of manganese, zinc and cobalt oxides, definite improvements in sintering performance are seen, while none of iron oxide, chromium oxide or nickel oxide yielded significant benefits.

TABLE IIIA

| | Compositions - Other Sintering Aides | | | |
|---|---|---|---|---|
| Example No. | Sintering Aides | | Ceramic Powder | |
| | Other Oxide | $TiO_2$ | $ZrO_2$ | $Y_2O_3$ |
| 25 | 1.3 ($MnO_2$) | 19.7 | 77.4 | 1.6 |
| 26 | 5.3 ($MnO_2$) | 18.9 | 74.3 | 1.5 |
| 27 | 1.4 (ZnO) | 19.7 | 77.3 | 1.6 |
| 28 | 5.6 (ZnO) | 18.9 | 74.0 | 1.5 |
| 29 | 0.5 ($Co_3O_4$) | 19.9 | 78.0 | 1.6 |
| 30 | 2.0 ($Co_3O_4$) | 19.6 | 76.9 | 1.6 |
| 31 | 0.7 ($Fe_2O_3$) | 19.85 | 77.8 | 1.6 |
| 32 | 2.9 ($Fe_2O_3$) | 19.4 | 76.1 | 1.55 |
| 33 | 1.55 (NiO) | 19.7 | 77.2 | 1.6 |
| 34 | 6.1 (NiO) | 18.8 | 73.6 | 1.5 |
| 35 | 0.8 ($Cr_2O_3$) | 19.8 | 77.8 | 1.6 |
| 36 | 3.1 ($Cr_2O_3$) | 19.4 | 76.0 | 1.5 |

TABLE IIIB

| | Sintering - Other Sintering Aides | | | | |
|---|---|---|---|---|---|
| | Sinter Treatment | | Open | | |
| Example No | Temp. (°C.) | Time (hrs) | Porosity (%) | Density (g/cc) | Sp.Gr. (g/cc) |
| 25 | 1200 | 3 | 28.8 | 3.97 | 5.57 |
| 26 | " | " | 3.4 | 5.30 | 5.49 |
| 27 | " | " | 38.9 | 3.41 | 5.58 |
| 28 | " | " | 3.0 | 5.42 | 5.58 |
| 29 | " | " | 29.0 | 3.96 | 5.57 |
| 30 | " | " | 2.8 | 5.42 | 5.57 |
| 31 | " | " | 32.5 | 3.75 | 5.56 |
| 32 | " | " | 27.0 | 4.04 | 5.54 |
| 33 | " | " | 28.8 | 3.97 | 5.58 |
| 34 | " | " | 20.0 | 4.46 | 5.57 |
| 35 | " | " | 40.8 | 3.28 | 5.57 |
| 36 | " | " | 41.1 | 3.23 | 5.48 |

The data presented in Table IIIB indicates that, while reductions in open porosity to levels below about 5% (volume) at temperatures 100° C. or more below the normal zero porosity sintering temperature of refractory ceramics is possible with the three effective transition metal oxide sintering aides described, only copper oxide dependably provides porosities below 2%, with zero open porosities in many cases, at these reduces sintering temperatures.

Whereas substitutions of carefully selected alternative transition metal oxides for copper oxide in the compositions of the invention can provide useful improvements in sintering characteristics, no substitution for titanium dioxide yielding equivalent improvements have been identified. Tables IVA and IVB below present stabilized zirconia compositions, reported in approximate mole percent, incorporating additions of sintering aides comprising combinations of copper oxide with oxides other than titania. In general, reductions in sintering temperature and/or reduced open porosity at conventional temperatures were not significant in these systems.

TABLE IVA

| | Compositions - Other Sintering Aides | | | |
|---|---|---|---|---|
| Example No. | Sintering Aides | | Ceramic Powder | |
| | CuO | $SnO_2$ | $ZrO_2$ | $Y_2O_3$ |
| 37 | — | 20.0 | 76.9 | 1.6 |
| 38 | 1.6 | 19.7 | 77.1 | 1.6 |
| 39 | 6.4 | 18.7 | 73.4 | 1.5 |

TABLE IVB

| | Sintering - Other Sintering Aides | | | | |
|---|---|---|---|---|---|
| | Sinter Treatment | | Open | | |
| Example No. | Temp. (°C.) | Time (hrs) | Porosity (%) | Density (g/cc) | Sp.Gr. (g/cc) |
| 37 | 1200 | 3 | 32.2 | 4.22 | 6.22 |
| | 1500 | " | 0.0 | 6.07 | 6.07 |
| 38 | 1200 | 3 | 15.3 | 5.09 | 6.01 |
| 39 | 1200 | 3 | 31.6 | 4.12 | 6.02 |

The combination of copper oxide and titanium dioxide is also very effective as a sintering aide in various other hard, refractory ceramic oxide systems including, for example alumina, mullite, spinel ($MgAl_2O_4$) and cordierite. Tables VA and VB below set forth representative compositions from selected ceramic systems other than zirconia, together with sintering results obtained from firing cold-pressed powder compacts having the compositions described. Again, the compositions in Table IVA represent molar proportions of ingredients, approximating mole percent (a total of 100 parts) in most cases.

TABLE VA

| | Compositions - Other Ceramic Powders | | |
|---|---|---|---|
| Example No. | Sintering Aides | | Ceramic Powder |
| | CuO | $TiO_2$ | Moles (Composition) |
| 40 | — | — | 100.0 (alumina) |
| 41 | 1.6 | 5.8 | 92.6 (alumina) |
| 42 | 4.6 | 8.1 | 87.3 (alumina) |
| 43 | — | — | 100.0 (spinel) |
| 44 | 2.3 | 8.1 | 89.6 (spinel) |
| 45 | 6.3 | 7.5 | 86.2 (spinel) |
| 46 | — | — | 100.0 (mullite) |
| 47 | 5.5 | 19.5 | 75.0 (mullite) |
| 48 | 14.8 | 17.6 | 67.6 (mullite) |
| 49 | — | — | 100.0 (cordierite) |
| 50 | 6.9 | 24.5 | 68.6 (cordierite) |
| 51 | 12.9 | 22.9 | 64.2 (cordierite) |

TABLE VB

| | Sintering - Other Ceramic Powders | | | | |
|---|---|---|---|---|---|
| | Sinter Treatment | | Open | | |
| Example No. | Temp. (°C.) | Time (hrs) | Porosity (%) | Density (g/cc) | Sp.Gr. (g/cc) |
| 40 | 1200 | 3 | 39.8 | 2.38 | 3.95 |
| 41 | 1100 | " | 0.1 | 3.86 | 3.86 |
| | 1200 | " | 0.0 | 3.97 | 3.97 |
| 42 | 1100 | " | 0.0 | 4.00 | 4.00 |
| 43 | 1200 | " | 45.8 | 1.91 | 3.52 |
| 44 | 1200 | " | 0.0 | 3.51 | 3.51 |
| 45 | 1100 | " | 12.6 | 3.15 | 3.60 |
| | 1200 | " | 0.0 | 3.43 | 3.43 |
| 46 | 1450 | " | 40.7 | 1.79 | 3.02 |
| 47 | 1400 | " | 6.6 | 2.85 | 3.06 |
| | 1450 | " | 0.0 | 3.07 | 3.07 |
| 48 | 1200 | " | 5.9 | 2.91 | 3.09 |
| | 1300 | " | 0.0 | 3.15 | 3.15 |
| 49 | 1200 | " | 30.3 | 1.72 | 2.47 |
| 50 | 1300 | " | 0.0 | 2.48 | 2.48 |
| 51 | 1200 | " | 0.0 | 2.57 | 2.57 |
| | 1300 | " | 0.0 | 2.59 | 2.59 |

Of particular interest in Table VB are the very high open porosities of the unmodified powders (Examples 40, 43, 46 and 49), even at high sintering temperatures. Hence poor sintering by alumina at 1200° C., spinel at 1200° C., mullite at 1450° C., and cordierite at 1200° C. is clearly evident, and in strong contrast to the behavior of the samples containing the sintering aides.

The use of the disclosed combination of sintering aides in balanced and sufficient proportion to achieve useful reductions in sintering temperature is also shown by sintering results observed in mixed oxide ceramic systems. Again, neither sintering aide component alone is effective to achieve such reductions, but surprising effectiveness is shown by the combination.

Table VIA and VIB below show the results of such sintering tests in mixed alumina-zirconia and spinel-zirconia compositions. The compositions containing only copper oxide or titanium oxide again showed relatively poor sintering, while mixed systems comprising adequate combinations of both additives generally demonstrated good consolidation at reduced temperatures with low or no open porosity in the products. Only Example 63 comprising a combination of spinel and zirconia retained more than 2% residual open porosity following all of the sintering treatments employed; that material also showed some evidence of structural imperfection (some microcracking) after 1200° C. for three hours.

TABLE VIA

| | Compositions - Mixed Oxide Systems | | | | |
|---|---|---|---|---|---|
| Ex. | Sintering Aides | | Ceramic Powders | | |
| No. | CuO | TiO$_2$ | Al$_2$O$_3$ (Other) | ZrO$_2$ | Y$_2$O$_3$ |
| 52 | 4.8 | — | 77.8 | 17.3 | — |
| 53 | — | 4.7 | 76.3 | 18.6 | 0.4 |
| 54 | 1.3 | 3.8 | 87.2 | 7.7 | — |
| 55 | 1.3 | 4.7 | 75.3 | 18.4 | 0.4 |
| 56 | 2.6 | 4.6 | 74.3 | 18.1 | 0.4 |
| 57 | 3.9 | 4.6 | 72.8 | 17.7 | 0.4 |
| 58 | 5.2 | 4.5 | 72.3 | 17.6 | 0.4 |
| 59 | 1.3 | 1.2 | 75.2 | 21.8 | 0.5 |
| 60 | 1.3 | 2.4 | 75.0 | 20.8 | 0.4 |
| 61 | 1.3 | 3.5 | 75.1 | 19.6 | 0.4 |
| 62 | 5.6 | 18.5 | 42.3 | 33.0 | 0.7 |
| 63 | 6.85 | 20.6 | 31.5(*) | 40.3 | 0.8 |

*(MgAl$_2$O$_4$)

TABLE VIB

| | Sintering - Mixed Oxide Systems | | | | |
|---|---|---|---|---|---|
| | Sinter Treatment | | Open | | |
| Example No | Temp. (°C.) | Time (hrs) | Porosity (%) | Density (g/cc) | Sp.Gr. (g/cc) |
| 52 | 1200 | 3 | 23.5 | 2.60 | 4.18 |
| 53 | " | 15 | 34.5 | 2.65 | 4.28 |
| 54 | 1100 | 3 | 0.7 | 3.93 | 3.95 |
| | 1200 | " | 0.0 | 4.03 | 4.03 |
| 55 | 1100 | " | 0.0 | 4.26 | 4.26 |
| 56 | 1200 | 15 | 1.6 | 4.20 | 4.27 |
| 57 | " | " | 1.6 | 4.20 | 4.27 |
| 58 | 1100 | 3 | 0.0 | 4.27 | 4.27 |
| | 1200 | 15 | — | 4.23 | — |
| 59 | " | 3 | 32.3 | 2.87 | 4.24 |
| 60 | 1200 | " | 8.4 | 3.94 | 4.30 |
| 61 | 1200 | " | 0.0 | 4.30 | 4.30 |
| 62 | 1100 | " | 6.8 | 4.27 | 4.58 |
| | 1200 | " | 1.7 | 4.60 | 4.68 |
| 63 | 1100 | " | 18.6 | 3.66 | 4.49 |
| | 1150 | " | 4.8 | 4.28 | 4.49 |
| | 1200 | " | 6.8 | 4.17 | 4.48 |

Physical properties testing of sintered ceramics selected from among the various materials described in the above Tables suggests that many of the desirable performance characteristics of the unmodified hard and tough ceramic materials are preserved in the modified sinterable compositions. This result is suggested by hardness and fracture toughness tests performed on some of these materials.

Hardness testing by Vickers diamond punch (10 kilograms load) conducted on the unstabilized and stabilized zirconia samples reported as Examples 21 and 24 above yielded Vickers hardness values of 7.6 GPa and 8.1 GPa, respectively. Similarly, fracture toughness measurements by conventional indentation methods (e.g., the method described by Anstis et al., *J. Am. Ceram. Soc.*, (September, 1981), pages 533–538) yielded values of 3.6 MPa$\sqrt{}$m and 5.25 MPa$\sqrt{}$m, respectively, for the same two samples. The alumina-zirconia ceramic of Example 55 demonstrated a Vickers hardness of 15.7 GPa with an indentation fracture toughness of 4.7 MPa$\sqrt{}$m.

Sintered ceramic products provided in accordance with the invention have also shown excellent flexural strength. For this testing, ceramic bars approximately 5 mm $\times$ 1 mm $\times$ 5.5 cm in size sintered as above described were broken in flexure under 4-point bending. An inner support span of 1.27 cm and an outer support span of 3.185 cm were used in bending.

Six bend bars having the composition of Example 55 had flexural strengths averaging 330 MPa (47.9 Ksi) in this test, even though a few large pores resulting from imperfect powder processing of the samples provided readily accessible crack initiation sites for fracture. Significantly higher strengths would be expected in products of the same composition where these processing imperfections were eliminated.

Finally, alumina-zirconia plates having the composition of Example 55 also demonstrated excellent resistance to long rod penetration in kinetic energy tests as an armor plating material. Hence, the performance of this ceramic very closely approximated that of the baseline sintered alumina plating even though the modified material of the invention is capable of being sintered to full density at much lower temperatures, and thus at lower energy cost.

X-ray diffraction analyses performed on selected sintered ceramic products having compositions such as above described indicate that the hard ceramics alumina, mullite, spinel and cordierite do not change in crystal structure in the presence of the added sintering aids. In the case of zirconia, where various crystal forms can coexist in the base ceramic, we find monoclinic zirconia normally predominating in the sinterable compositions, but with tetragonal zirconia present as the major phase in selected systems.

Particularly noteworthy in the X-ray diffraction results is the fact that the alumina-zirconia and spinel-zirconia ceramics frequently show evidence of tetragonal zirconia development. This is an indication that tetragonal-zirconia-toughened alumina and spinel ceramics capable of densification at greatly reduced temperatures may be provided in these ceramic systems. The use of a ceria stabilizer for zirconia-based ceramics (as in Example 24 above), rather than yttria or the other stabilizers evaluated, also appears to favor the development of tetragonal zirconia in preference to other zirconia phases.

While the mechanism operating to produce the results hereinabove described is not completely understood, there is some evidence that titania and copper oxide form a eutectic liquid at temperatures below 1000° C. This liquid would produce fast mass transport of kinetic species in the powder compact, resulting in much lower densification temperatures and times for these oxide materials.

On this premise it is also expected that ternary systems of sintering aides, e.g., titania, copper oxide and manganese oxide used together, should manifest an even lower eutectic temperature, providing even greater reductions in densification temperature than the specific examples disclosed above.

Of course, hot pressing or other consolidation methods involving the pressure consolidation of these materials could also be used to considerable advantage, where such could be cost-justified. Moreover, the super-plastic forming characteristics of these materials should greatly facilitate the high temperature processing thereof by means of hot forging or the like.

The wide-ranging utility of sinterable ceramic compositions produced as above described will be immediately apparent to those skilled in the art. Hence, these compositions may be used for a variety engine parts including bearings, roller bearings, cam followers, piston liners cylinder heads, piston caps, bearing races, and wearpads. Potential applications in higher temperature environments include solid electrolytes for oxygen sensors, fuel cells, or other devices requiring ionically conducting refractory ceramic parts. And, these compositions may readily be extruded and then sintered to provide refractory honeycomb or other complex ceramic structures for coarse filtration, catalyst support, or other high temperature uses.

Sinterable ceramics are also useful for applications involving electrical insulation, including electrically insulating single layer substrates for semiconductors, as well as multilayer substrates for other electronic applications not requiring extremely high dielectric constants. Of course, multilayer substrates comprising metallic circuit components may require powder sintering at carefully controlled oxygen partial pressures to protect metallic circuit components during manufacture.

In light of the foregoing it will be appreciated that the materials and procedures specifically described herein are presented for purposes of illustration only and are not intended to be limiting. Thus numerous modifications and variations upon the compositions and processes specifically described herein may be resorted to by those skilled in the art within the scope of the appended claims.

We claim:

1. A refractory ceramic article having a composition consisting essentially of:
   (a) a hard crystalline ceramic component selected from the group consisting of zirconia, partially stabilized zirconia, stabilized zirconia, alumina, mullite, cordierite, $MgAl_2O_4$ spinel, and combinations thereof; and
   (b) a sintering aide component consisting essentially of a combination of $TiO_2$ and a transition metal oxide selected from the group consisting of copper oxide, manganese oxide, cobalt oxide and zinc oxide,
   the sintering aide component including at least about 3.5 mole percent $TiO_2$, at least about 1.3 mole percent of the transition metal oxides, and about 4.8-50 mole percent total of $TiO_2$ + transition metal oxide.

2. A refractory ceramic article in accordance with claim 1 which comprises not more than 5 volume percent of open porosity.

3. A refractory ceramic article in accordance with claim 1 having substantially zero open porosity and wherein the transition metal oxide consists essentially of copper oxide.

4. A refractory ceramic article in accordance with claim 1 wherein the hard crystalline ceramic is selected from the group consisting of zirconia, partially stabilized zirconia, and stabilized zirconia.

5. A refractory ceramic article in accordance with claim 1 wherein the hard crystalline ceramic consists essentially of a mixture of alumina and a ceramic selected from the group consisting of zirconia, partially stabilized zirconia, and stabilized zirconia.

6. A method for making a hard sintered crystalline ceramic product at a reduced sintering temperature which comprises the steps of:
   (a) providing a ceramic powder selected from the group consisting of zirconia, stabilized zirconia, partially stabilized zirconia, alumina, mullite, cordierite, $MgAl_2O_4$ spinel, and combinations thereof;
   (b) combining the ceramic powder with a sintering aide to provide a sinterable mixture, the sintering aide consisting essentially of a combination of $TiO_2$ and at least one transition metal oxide selected from the group consisting of copper oxide, manganese oxide, cobalt oxide and zinc oxide, and the sinterable mixture comprising at least about 3.5 mole percent $TiO_2$, at least about 1.3 mole percent of transition metal oxides, about 4.8-50 mole percent total of $TiO_2$ + transition metal oxides, and the remainder ceramic powder; and
   (c) heating the sinterable mixture to a temperature at least sufficient to provide a hard crystalline sintered ceramic product having not more than 5% by volume of open porosity.

7. A method in accordance with claim 6 wherein the sinterable mixture is heated to a temperature which is (i) at least 100° C. below the minimum sintering temperature for zero porosity sintering of the ceramic powder, and (ii) sufficient to provide a hard crystalline sintered ceramic product having not more than 2% by volume of open porosity.

8. A method in accordance with claim 7 wherein the sinterable mixture is heated to a temperature in the range of 800°-1100° C.

9. A method in accordance with claim 8 wherein the transition metal oxide consists essentially of copper oxide.

10. A method in accordance with claim 9 wherein the ceramic powder has a composition selected from the group consisting of zirconia, partially stabilized zirconia, and stabilized zirconia.

11. A method in accordance with claim 9 wherein the ceramic powder consists essentially of a mixture of alumina and a ceramic selected from the group consisting of zirconia, partially stabilized zirconia, and stabilized zirconia.

* * * * *